Aug. 29, 1939.       F. W. TRABOLD        2,171,196
FRANKFURTER-FORMING APPARATUS
Filed Oct. 31, 1938
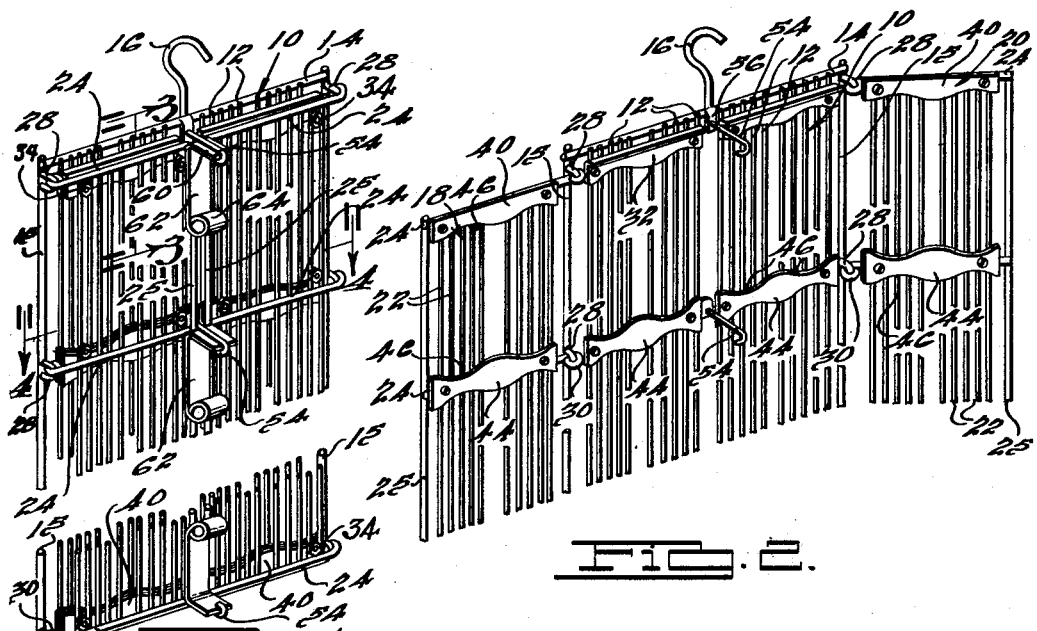
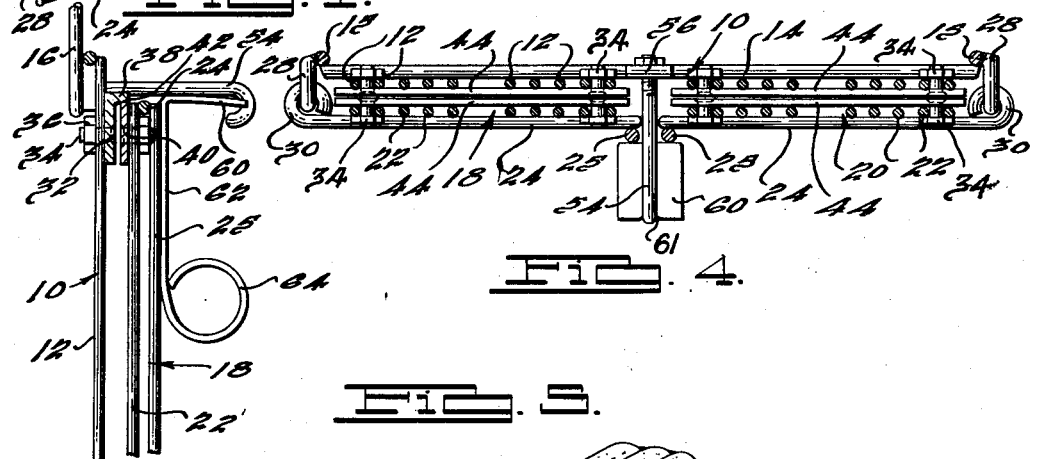
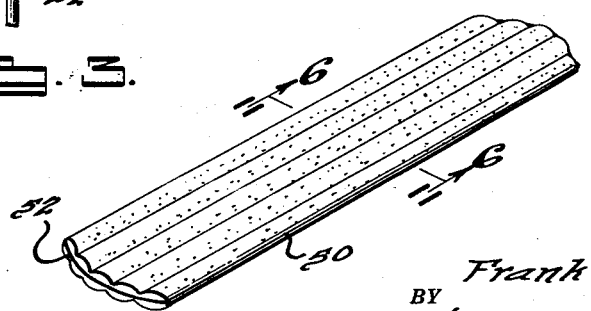
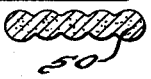
INVENTOR
*Frank W. Trabold.*
BY
*Harness, Dickey & Pierce.*
ATTORNEYS.

Patented Aug. 29, 1939

2,171,196

UNITED STATES PATENT OFFICE 2,171,196

FRANKFURTER-FORMING APPARATUS

Frank W. Trabold, Detroit, Mich.; Detroit Trust Company and Irma J. F. Trabold, executors of said Frank W. Trabold, deceased Application October 31, 1938, Serial No. 237,823

4 Claims. (Cl. 17—34)

This invention relates to improved apparatus for use in the formation and treatment of frankfurter sausages and the like.

One of the primary objects of the present invention is to provide an improved apparatus in the form of an open frame construction for deforming frankfurter sausages into flat shape and holding them in such shape during treatment, whereby they take a permanent set.

Another object of the invention is to provide an improved apparatus of the type mentioned within which elongated strips of frankfurter sausages may be placed without the usual linkage steps and within which the strips are deformed and separated into a plurality of individually shaped, flat frankfurters.

Another object of the invention is to provide an improved apparatus of the type mentioned which engages the ends of elongated strips of sausage so that the meat is retained within the casings without the necessity of twisting or tying the ends.

Another object of the invention is to provide a novel means for clamping the ends of an elongated strip of sausage whereby the meat is not displaced from the casing during the deforming operation.

Another object of the invention is to provide an apparatus of the type mentioned by which the usual linkage steps by twisting and tying are eliminated, thereby effecting economies in manufacture and material.

Other objects of the invention will become apparent from the following specification, the drawing relating thereto, and from the claims hereinafter set forth.

In the drawing, in which like numerals are used to designate like parts in the several views throughout:

Figure 1 is a broken, perspective view of a grid-like frame construction for deforming elongated strips of sausage into flat individual shape and for holding them in such shape during processing treatment, the frame members being shown in closed positions;

Fig. 2 is a partial, perspective view of the structure shown in Fig. 1, showing the frame members open;

Fig. 3 is an enlarged, cross-sectional view, with parts in elevation taken substantially along the line 3—3 of Fig. 1;

Fig. 4 is an enlarged, cross-sectional view, with parts in elevation, taken substantially along the line 4—4 of Fig. 1;

Fig. 5 is a perspective view of an individual frankfurter sausage, formed according to the present invention; and Fig. 6 is a cross-sectional view taken substantially along the line 6—6 of Fig. 5.

The present invention relates to improvements over the type of framework disclosed in the co-pending application of Frank W. Trabold, Serial No. 183,867, filed January 7, 1938. The framework disclosed in the present application is adapted to form frankfurter sausages into a flat shape and to hold the sausages in such shape during the processing steps described in the co-pending application referred to in order to impart a permanent set to the sausages. Reference may be had to the co-pending application referred to for a more complete description of the processing steps to which the frankfurters are subjected; but for an understanding of the present invention, it is merely necessary to understand that the strips of elongated sausage are deformed to the flat shape desired and then subjected to smoking and cooking processing steps whereby the sausages take on a permanent set in their flat shape. The individual sausages may thereafter be subjected to additional cooking and will not become distorted during such cooking.

According to the present invention, an improved framework is provided in which a plurality of elongated strips of sausage are disposed within the frame and deformed. The strips of sausage referred to are in the form of packed sausage meat enclosed within elastic casings. The strips are originally substantially circular in cross-section and may be cut into the desired lengths as they issue from the forming machine. When using the frame according to the present invention, it is not necessary to link the strips, that is, twist or tie the casing at spaced points therealong; but the strips may be disposed directly within the frame. Clamping means are provided which engage and clamp the open ends of the strip so that the meat is not forced out of the ends of the casing when pressure is applied to flatten the strip. Partitioning members are also provided on the frame members which serve to divide the elongated strip into a plurality of individual sausages which are generally flat in shape.

For a better understanding of the invention, reference may be had to the accompanying drawing in which an improved framework according to the present invention is shown by way of illustration. A grid-like frame, generally indicated at 10, is provided which includes a plurality of longitudinally extending, transversely spaced rod or wire members 12. A plurality of other rod or wire members 14, preferably of slightly greater gauge than the wire members 12, extend transversely of the member 12 at spaced intervals longitudinally thereof and are welded to the members 12. The members 14 are disposed on the outer surfaces of the members 12 so that the inner surfaces thereof are free from obstruction and lie in substantially the same plane.

The members 12 are preferably arranged in groups across the frame member 10, and in the embodiment illustrated, each group includes five rod members 12 with slightly greater spaces between the groups than between the individual rod members, and there being four of such groups. Each group represents a transverse portion of the frame member, with each portion extending the length of the frame member, and each of such portions is adapted to receive thereon an elongated strip of frankfurter sausage.

Longitudinally extending rod members 15 are welded to the outer ends of the members 14 and are disposed slightly outwardly from the outermost edge members 12. The members 15 serve to strengthen the frame construction and also serve as a mounting means for other frame members in a manner to be described in more detail hereinafter.

A hook member 16 is welded to the uppermost transverse member 14 at substantially the transverse center thereof and serves as a means for suspending the frame construction in a smoke oven or cooking oven.

A pair of other cooperating frame members generally indicated at 18 and 20 are provided which cooperate with the frame member 10 to form the strips of sausage into flat shape. The frame members 18 and 20 are similar to each other and each includes a plurality of longitudinally extending, transversely spaced rod or wire members 22, similar to the members 12. These rod members 22 are grouped in the same manner as the rod members 12 above described.

A plurality of other rod or wire members 24, corresponding in position to the wire members 14, extend transversely of the members 22 at spaced intervals longitudinally thereof and are welded thereto.

Longitudinally extending rod or wire members 25 are welded to the outer surfaces of the members 22 adjacent the inner ends thereof, on each of the frame members 18 and 20. These members 25 serve to strengthen the frame members 18 and 20 and also serve to assist in clamping the frame members together, as will be apparent from the following description.

The frame members 18 and 20 are hingedly mounted to the outer edge members 15 of the frame 10. In order to so mount the frame members 18 and 20, U-shaped members 28 are welded to the edge members 15 at spaced intervals therealong. The outer ends of the transverse members 24 are then looped through the U-shaped members 28, as indicated at 30, so that each frame member 18 and 20 may open and close relative to the frame member 10.

As the frankfurter sausage issues from the forming machine, in which the meat is packed within an elastic casing, it may be cut into lengths which are substantially equal to the length of the frame 10. These strips do not need to be linked, nor do they need to have their ends closed, but may be placed on the frame member side by side, one on each of the above mentioned groups of rod members 12 and extend the entire length of the frame. Cooperating means are then provided on the frame members for clamping the ends of the strips and also for partitioning the strips into a plurality of individual sections while the strips are being flattened.

The clamping means referred to include transversely extending plate members 32 which are disposed across the frame member 10 at each end thereof. The members 32 may be fixed to the frame member 10 by means of bolts 34 which extend between the spaces between adjacent rod members 22. Nuts 36 are threadably received over the bolts 34 and overlie the adjacent rod members 22 so that the plate members 32 are fixed in position. The plate members 32 are provided with inwardly disposed flanges 38 along the outer edges thereof which lie substantially normal to the plane of the frame member 10. Cooperating plate members 40 are fixed to the frame members 18 and 20 at the ends thereof in overlying positions relative to their respective plate members 32. Each of such plate members 40 has an edge portion 42 which is adapted to cooperate with the flange 38 to clamp or pinch the ends of the sausage strip together so that the meat may not be forced out through the ends of the casing when pressure is applied.

In order to partition the strips into individual frankfurter sections, transversely extending partitioning members 44 are mounted on the frame members 10, 18, and 20 at spaced intervals longitudinally thereof. The partitioning members 44 are preferably positioned to overlie the transverse members 14 on the frame member 10 and to underlie the transverse members 24 on the frame members 18 and 20. The partitioning members and the members 40 may be secured to their respective frame members in the same manner as the member 32 is secured by the bolts 34 and nuts 36 described above. In this way, the partitioning members 44 may be adjustably mounted along the lengths of their respective frames or may be removed for replacement by other partitioning members having different shapes.

The partitioning members 44 and the end members 32 and 40 have facing curved edges 46 overlying each of the groups of the frame members 12 and 22 so that the individual frankfurters, as indicated in Fig. 5 at 50, have rounded ends 52. Other shapes may be imparted to these edges, if desired, in order to give other shapes to the ends of the frankfurters. For example, the edge may be straight or angled. The rod members 12 and 22 serve to produce a ribbed effect in the finished frankfurter as clearly shown in Figs. 5 and 6. These features impart distinctive characteristics to the resultant frankfurter sections.

The strips of sausage are placed upon the respective groups when the frame members are in the open position, as shown in Fig. 2, and the frame members 18 and 20 are then closed to the position indicated in Fig. 1. The closing of the frame members 18 and 20 causes an application of pressure against the sausage strips, which flattens the strips into the shape shown in Fig. 6. When in this closed position, the members 40 overlie the members 32 and the members 44 on their respective frames overlie each other as described above. The frame members are then resiliently clamped together so as to exert substantial pressure against the strips of sausage. The means for clamping the two frames together include a plurality of outstanding hook members 54 which are fixed to base portions 56. The base portions 56 are welded to the transversely extending members 14 on the frame 10 at substantially the transverse center thereof so that the hook members 54 extend outwardly between the edge members 25 of the frames 18 and 20 when in their closed position.

A removable clamping bar having an upstanding portion 60 and a leverage portion 62 is provided for each of the hook members 54. The leverage portion 62 terminates in an eye 64 which serves as a convenient finger gripping means for releasing or positioning the clamping member. By inserting the upstanding portion 60 so that the upper edge thereof engages under the hook 54, preferably within a notch 61 in the upper edge, the lower corner bears against the adjacent rod members 25. By then exerting pressure against the outer end of the leverage portion, the frame members 18 and 20 are urged against the strips of sausage placed on the frame 10.

The hooks 54 are positioned adjacent the end clamping means 32 and 40 and the partitioning members 44, so that the pressure is most directly applied at these points in order that the strips of sausage be partitioned into individual sections. The members 32, 40, and 44 are forced almost entirely against each other by the application of pressure. Although the casing is not severed by this pressure, the meat within the casing is separated into individual frankfurters which are separated from each other when the casing is removed.

Formal changes may be made in the specific embodiment of the invention described without departing from the spirit and substance of the invention, the scope of which is commensurate with the appended claims.

What is claimed is:

1. An apparatus for processing frankfurter sausages and the like, comprising an openwork frame member adapted to receive an elongated strip of frankfurter sausage, a plurality of transversely extending partition members on said frame member at spaced intervals therealong, a cooperating openwork frame member adapted to overlie said first named frame member against said strip, and clamping means adapted to engage the ends of said strip, said clamping means including transversely extending plate members mounted on one of said frame members adjacent the ends thereof, said plate members having transversely extending, inwardly directed flanges along the outer edges thereof, and other transversely extending plate members on the other of said frame members positioned to cooperate with said first named plate members with the outer edge of said other plate members lying closely adjacent to its respective flange.

2. An apparatus for processing frankfurter sausages and the like, comprising an openwork frame member adapted to receive an elongated strip of frankfurter sausage, a plurality of transversely extending partition members on said frame member at spaced intervals therealong, a cooperating openwork frame member adapted to overlie said first named frame member against said strip, a plurality of transversely extending partition members on said cooperating frame member as spaced intervals therealong, corresponding to the positions of said first named partition members on said first named frame member, said partition members having curved facing edges, and clamping means engaging said frame members and urging them together to deform said strip into a plurality of individual, flat frankfurter sausages.

3. An apparatus for producing frankfurter sausages and the like, comprising an openwork frame member adapted to receive an elongated strip of frankfurter sausage, a plurality of transversely extending partition members on said frame member at spaced intervals therealong, a pair of cooperating openwork frame members adapted to overlie said first named frame member against said strip, means hingedly mounting the outer edges of each of said pair of frame members to said first named frame member, and clamping means engaging said frame members and positioned at substantially the transverse center of said frame members, urging them together to deform said strip into a plurality of individual flat frankfurter sausages.

4. An apparatus for producing frankfurter sausages and the like, comprising an openwork frame member adapted to receive a plurality of elongated strips of frankfurter sausage thereon, arranged side by side, said frame member including a plurality of longitudinally extending, transversely spaced partition members, a plurality of transversely extending partition members on said rod members at spaced intervals therealong, a pair of cooperating openwork frame members adapted to overlie said first named frame members against said strip, means pivotally mounting the outer edges of each of said pair of cooperating frame members to the outer edges of said first named frame member, said cooperating frame members including a plurality of longitudinally extending, transversely spaced rod members, and clamping means disposed at substantially the transverse center of said frame members adjacent said partitioning members, said clamping means engaging said frame members and urging them together to deform said strip into a plurality of individual flat frankfurter sausages.

FRANK W. TRABOLD.